United States Patent [19]

Takatsuka et al.

[11] Patent Number: 5,014,146
[45] Date of Patent: May 7, 1991

[54] MAGNETIC HEAD MOUNTING ARM HAVING ASYMMETRICAL CONFIGURATION

[75] Inventors: Akio Takatsuka; Asao Sasamoto, both of Odawara; Yoshihiro Moribe, Chigasaki; Toshio Shiono, Odawara; Chikayuki Sogabe, Odawara; Haruhiko Hosokawa, Odawara, all of Japan

[73] Assignee: Hitachi, Ltd., Tokyo, Japan

[21] Appl. No.: 301,712

[22] Filed: Jan. 26, 1989

[30] Foreign Application Priority Data

Jan. 27, 1988 [JP] Japan .................................. 63-14573

[51] Int. Cl.⁵ .............................................. G11B 5/55
[52] U.S. Cl. ................................. 360/106; 360/98.01
[58] Field of Search ................... 360/106, 98.01, 97.03

[56] References Cited

U.S. PATENT DOCUMENTS

| | | | |
|---|---|---|---|
| 4,620,251 | 10/1986 | Gitzendanner . | |
| 4,787,001 | 11/1988 | Okutsu | 360/106 |
| 4,879,618 | 11/1989 | Iida | 360/106 |
| 4,949,194 | 8/1990 | MacPherson | 360/106 X |

*Primary Examiner*—A. J. Heinz
*Attorney, Agent, or Firm*—Fay, Sharpe, Beall, Fagan, Minnich & McKee

[57] ABSTRACT

A favorable balance of mass and strength is provided by the truss type beam formed through the use of triangular apertures in the head arm, which further can be arranged to provide a greater leading edge beam strength than trailing edge beam strength. With increased density of data and correspondingly decreased flying height, favorable results are obtained by making the outermost yaw angle greater than the innermost yaw angle. Mass unbalance can be corrected by shifting the coil position.

42 Claims, 11 Drawing Sheets

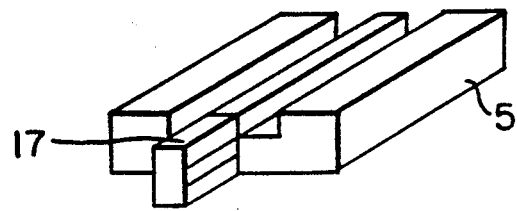
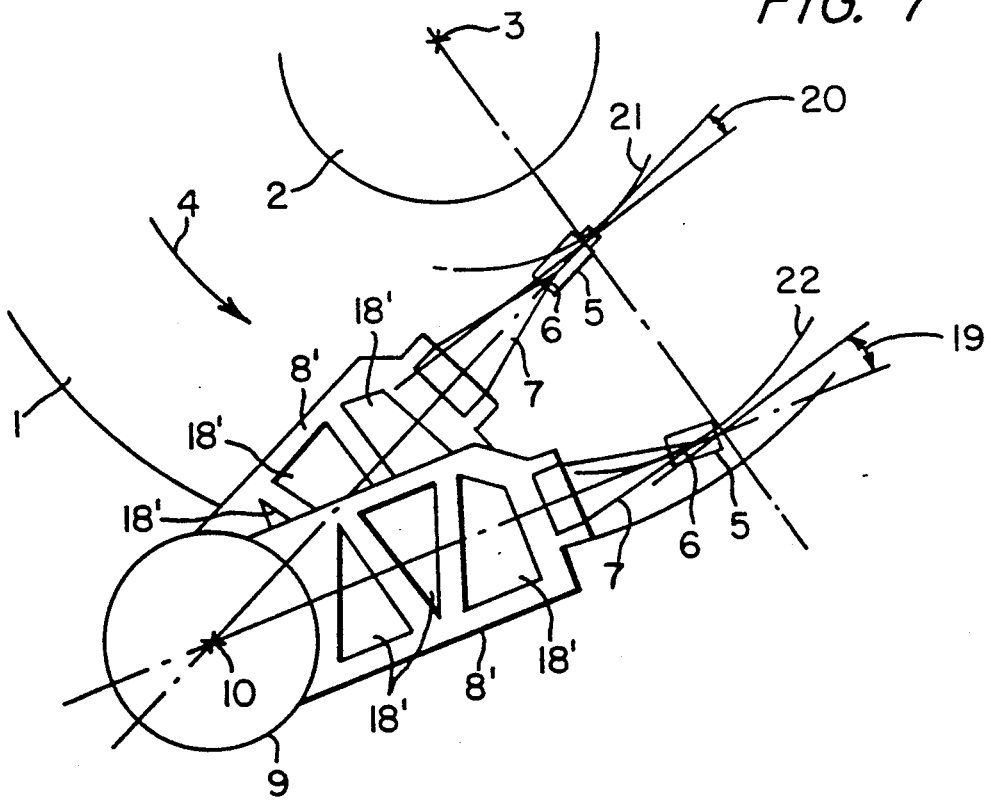

MAGNETIC HEAD MOUNTING ARM HAVING ASYMMETRICAL CONFIGURATION

BACKGROUND OF THE INVENTION

The present invention relates to a head assembly for a disc drive unit, particularly a magnetic head assembly for a multiple hard disc drive unit.

Early head assemblies were of the type known as the dog leg configuration, for example as shown in FIG. 1 of U.S. Pat. No. 4,620,251. More recently, as shown in the same patent, the head assembly is of the straight-line type, wherein the head arm, load spring, gimbal spring and head are symmetrical with respect to a line passing through the center of the head flying surface and the axis of rotation of the head assembly.

SUMMARY OF THE INVENTION

It is an object of the present invention to improve the head assembly of a disc drive unit. More particularly, it is an object to improve the wind resistance and resistance to vibration, particularly by increasing the natural resonance frequency of the head within the plane of the disc, to improve the access time characteristics of the head assembly, and, in general, to improve the reliability of the head assembly.

As a part of the present invention, there is the following analysis of the structure and operating characteristics of U.S. Pat. No. 4,620,251, with a representative structure being set forth in FIG. 2 for purposes of analysis and forming a part of the present invention.

The symmetry represented by FIG. 2 has been found to provide equal stiffness with respect to a distributed loading along the leading edge as well as the trailing edge, with respect to loading applied within the plane of the disc. Conceptually the present inventors recognize that the loading comes from the wind resistance produced by rotation of the disc so that equal stiffness is not necessary and further is not desirable in that it is a waste of material strength and thus an inefficient usage of mass of the head arm. Particularly, it is desirable to reduce the mass of the head arm as much as possible, for reducing access time by reducing the moment of inertia of the movable head assembly. The present inventors have found that by increasing the stiffness on the leading edge of the head arm, for the same mass, the natural resonant frequency of the head assembly, particularly the transducer head, in the plane of the disc, can be increased and thereby improve alignment of the head with the track. This increased stiffness may be provided by a difference in leading and trailing edge beams as caused by a difference in thickness and/or a difference in through apertures.

A favorable balance of mass and strength is provided by the truss type beam formed through the use of triangular apertures in the head arm, which further can be arranged to provide a greater leading edge beam strength than trailing edge beam strength.

The inventors have further realized that with increased density of data and correspondingly decreased flying height, favorable results are obtained by making the outermost yaw angle greater than the innermost yaw angle.

BRIEF DESCRIPTION OF THE DRAWINGS

Further objects, features and advantages of the present invention will become more clear from the following more detailed description of a preferred embodiment, shown in the drawing, wherein:

FIG. 5 is a perspective view a transducer head, usable with the present invention;

FIG. 7 is a plan view of a head assembly showing yaw angle relationships according to the present invention;

DETAILED DESCRIPTION OF THE PREFERRED EMBODIMENT

Figure 2:
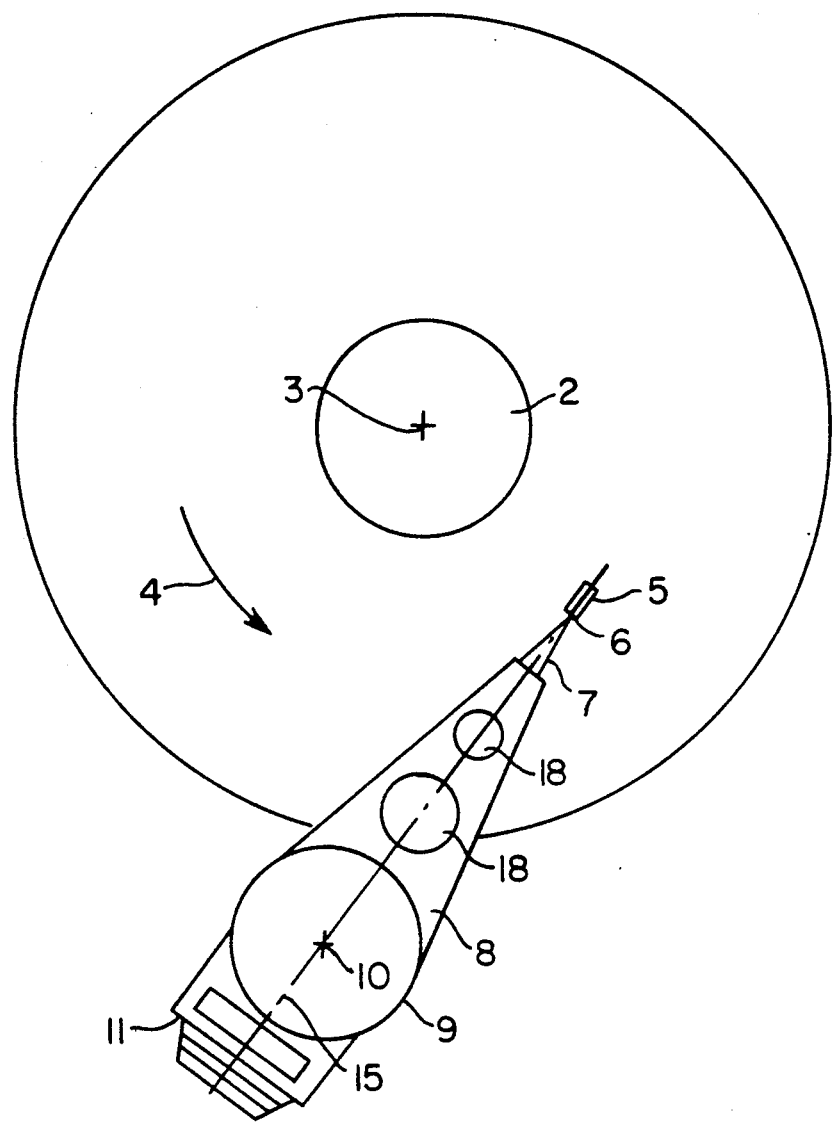
FIG. 2 is a plan view of a disc drive assembly relating to an analysis forming a conceptional portion of the present invention.

As a conceptual portion of the present invention, there is the following analysis of a symmetrical straight-in-line head assembly and actuator coil as shown in FIG. 2. Structurally, the assembly may be of the type as shown in the above mentioned U.S. Pat. No. 4,620,251. A recording disc, particularly a magnetic recording hard disc 1 is mounted by means of a disc clamp 2 for rotation about an axis of rotation 3 in the direction of arrow 4. A magnetic transducer head, simply a head, includes a slider or flying surface for holding it closely adjacent to the recording surface of the disc 1, for writing or reading information into or from the disc 1. This head is supported by a gimbal spring 6 mounted on one end of a plate type or cantilevered load spring 7, with the other end of the load spring 7 being mounted on the outer end of the cantilevered head arm 8. The load spring 7 thereby produces a bias tending to move the head 5 against the rotating disc 1, where it is held at a flying height by the aerodynamic slider surface of the head adjacent the disc, during rotation of the disc that produces air movement or wind in the peripheral direction of the arrow 4. The inner end of the head arm 8 is secured to a hub 9 mounted on a shaft 10 for rotation or swinging about the axis of the shaft 10 that is parallel of the axis 3 of the disc 1. The actuator coil 11 is also mounted to the hub 9, for providing the actuator or operating mechanism for swinging the head assembly about the axis of the shaft 10. This coil provides a torque about the axis of the shaft 10 for positioning the head 5 adjacent a selected track on the disc 1 with the coil cooperatively acting with a magnetic device (not shown) that is conventional. The above described components 5, 6, 8, 9, 10 and 11 constitute a movable head assembly for magnetic discs.

A line 15, within the plane of the disc 1 or parallel thereto, is defined by the following two points: the axis of rotation for the head assembly and the center of the flying surface for the head 5. The arm 8 is made of a material as hard and as light as possible in order to provide rigidity for the cantilevered beam connecting the load spring 7 and the rotational shaft 10. A plurality of holes 18 are punched or otherwise formed in the arm 8 to reduce its weight. This construction is known as the symmetrical straight-in-line head assembly, wherein each of the head 5, gimbal spring 6, load spring 7, head arm 8, hub 9, shaft 10, and coil 11 are symmetrical and aligned with the line 15. That is the entire rotatable head assembly is symmetrical with respect to the line 15 passing through the axis of rotation and the center of the flying surface for the head. Further, it is noted from the relationship of this line 15 with the direction of rotation 4 of the disc, that the components of the movable head assembly are generally perpendicular to the direction of movement 4 of the adjacent disc structure, and therefore generally perpendicular to the wind or air movement provided by the high rotational speed of the disc 1. This structure would be quite effective if all of the forces exerted on the movable head assembly that are caused by the wind moving generally in the peripheral direction were also symmetrical with respect to the central axis 15. However, in practice, this is not the case as the following analysis will show.

In practice, the line 15 extends substantially obliquely to the direction of movement of the disc 1, and therefore obliquely to the wind produced by rotation of the disc 1. Therefore, the wind flow or wind loading on the head assembly is asymmetrical with respect to the line 15. This conceptional analysis that is a part of the present invention has produced a conceptional additional part of the present invention relating to forming the movable head arm assembly asymmetrical with respect to the central line 15 for gaining good effective operating strength while reducing the mass and therefore the inertia or response time of the movable head assembly.

Therefore, it is seen that the wind produced by the high rotational speed of the disc 1, produces asymmetrical forces on the movable head assembly with respect to the line 15. In FIG. 2, for example, if the disc is rotated counterclockwise as indicated by the arrow 4, the resulting air streams or wind will be blown against the head arm 8 sideways, with the arm 8 subjected to greater wind forces on the upstream side, with respect to the line 15, than on the downstream side. This asymmetrical wind force, the external forces, may cause problems with respect to the head arm 8 to produce mechanical vibration. This asymmetrical loading producing mechanical vibrations, particularly at a natural frequency, will increase as the head arm 8 has a lower rigidity on the upstream side. That is, the upstream side beam strength is of greater importance than the downstream side beam strength with respect to the mechanical vibrations caused by this asymmetrical wind loading or distributed loading. Vibrations of the arm 8 will produce corresponding movement of the head 5 and therefore misalignment of the head 5, at times, with respect to the track and therefore an unreliable operation.

According to this analysis, it is an object of the present invention to overcome these problems and to provide a magnetic head assembly for magnetic disc drives that is light in weight and therefore fast in response time, without lessening the effective head arm strength and particularly preventing resonant mechanical vibration when the head arm is subjected to the asymmetrical wind forces of operation.

The specific structure to accomplish this purpose, according to the preferred embodiment, employs a configuration of the outer periphery of the head arm, or a configuration of the aperture in the head arm, or a configuration of the upstream beam vs. the downstream beam of the head arm such that there is a greater stiffness to distributive loading in the plane of the disc for the upstream edge than for corresponding loading on the downstream edge. That is, the head arm is asymmetrically constructed for asymmetric cantilevered beam strength with respect to improving stiffness on the upstream edge as compared to corresponding stiffness on the downstream edge, to counteract the above analyzed asymmetric wind forces produced by rotation of the disc 1, with respect to the center line 15.

As a practical construction, the mass of the head arm is effectively reduced by a plurality of punched holes, as seen in plane view, to provide a corresponding reduction in the inertia of the head assembly, and these punched holes are formed such that the beam on the upstream edge is stiffer than the beam on the downstream edge, or the holes have a greater plane area on the downstream side of the line 15 than on the upstream side of the line 15, or the head arm has an asymmetrical exterior periphery with respect to the line 15, or similarly the head arm is constructed in other manners, for example with respect to uneven thickness between the upstream and downstream side, to in any case form a greater stiffness with respect to distributive loading on the upstream edge than distributive loading on the downstream edge.

Further asymmetry with respect to an practical embodiment of the present invention involves the employment of an integrated circuit, IC, for reading and writing data to be mounted on the downstream side of the head arm, for reduced wind resistance. This asymmetry substantially changes the mass orientation of the movable head assembly with respect to the line 15, that is it increases it on the downstream side of the line 15. To provide a greater mass balance with respect to the axis of rotation of the shaft 10, the present invention shifts the actuating coil 11' to the opposite direction of the shifting of the IC with respect to the line 15, that is the coil 11' is shifted towards the upstream side of the line 15, whereby the previous imbalance of mass is rectified so that again the center of gravity or center of mass is located on the rotational axis of the shaft 10, that is the movement about the central axis will be balanced. This will improve response time and reliability.

The holes that are punched to form the asymmetrical rigidity of the arm may be circular as shown in FIG. 2 and shifted towards the downstream side of the line 15 from their symmetrical showing in FIG. 2, to provide the greater stiffness for the thus formed upstream beam. Further, such holes may be triangular or trapezoidal punched holes to more effectively reduce the weight while maintaining beam strength, and thereby reducing the inertial moment of the arm while maintaining the high desired stiffness on the upstream side or upstream edge.

In operation, airstreams are produced concentrically, for example, as shown in FIG. 7 by the rotation of the disc 1 at high speed. These airstreams or wind cause symmetrical external forces on the magnetic head, in general, because at a positioning of the head with respect to one of the internal tracks, the head will be positioned generally tangential to such track and therefore in elongated alignment with the direction of the wind. Thus, the wind forces on the head are generally symmetrical and can be ignored according to the present analysis. This will effectively be true even though the head is swung selectively between tracks. Thus, the wind will not produce any asymmetrical forces on the head arm due to the wind loading on the head. Also, by its nature, the load spring 7 is quite thin and is not a major contributor to wind loading. The head arm, being thicker, more massive and located adjacent the outer periphery where the wind is strongest is the major contributor to wind loading.

The head arm 8' extends obliquely to the direction 4 of rotation of the disc, that is obliquely to the direction of the wind caused by disc rotation. Therefore, the head arm 7 is subjected to external distributed forces acting along the leading edge of the head arm within the plane of the head arm parallel to the plane of the disc 1. These distributed forces are at an angle with respect to the reference line 15, so that they include a component of the distributed forces perpendicular to the line 15, and asymmetric with respect to the line 15. That is, these distributed forces are along the upstream edge of the head arm 8', thus making them asymmetric with respect to the line 15. Correspondingly, the head arm 8' is constructed to have a greater stiffness with respect to distributed forces applied to the leading edge of the head arm 8', that is greater than the corresponding stiffness of the trailing edge of the head arm 8' with respect to the same type of distributive load applied to the opposite direction to the trailing edge. Upstream refers to the upstream side with respect to the wind, that is, for example in FIG. 7 facing to the left toward the incoming wind caused by the rotation of the disc in the direction 4. According to this asymmetric stiffness of the head arm 8', it is possible to provide the head arm with a greater resistance to mechanical vibrations of the head within the plane of the disc than would be obtained with a like head arm of the same mass constructed with symmetrical stiffness. With the increased stiffness, it is possible to increase the resonance frequency of such mechanical vibrations to outside the operating range of the disc drive unit, even with the application of the asymmetric distributive load.

Figure 1:
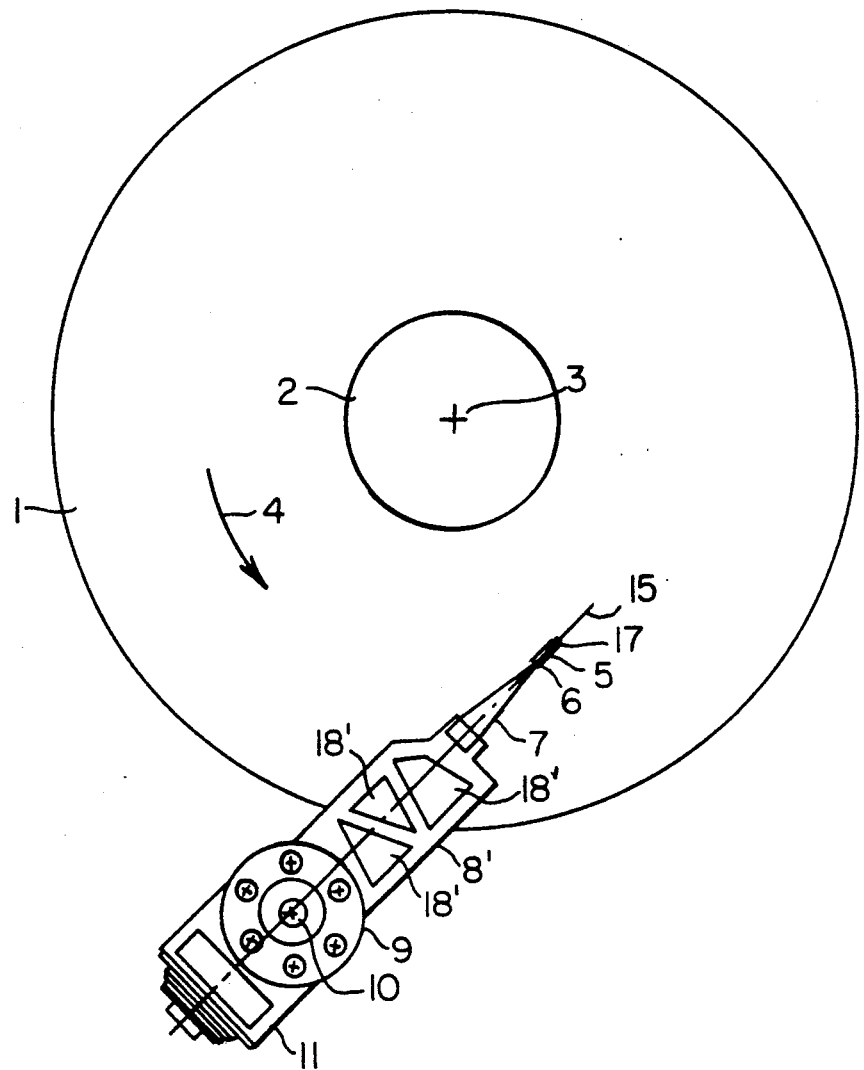
FIG. 1 is a plan view of a disc drive assembly including the features of the present invention.

In general, head arms are fabricated by punching holes in a metal plate of uniform thickness, high rigidity and small mass. According to the present invention, the punched holes are likewise provided to reduce the weight and thus reduce the moment of inertia, but they are also provided asymmetrically, according to one embodiment, with respect to the line 15 of the head arm so that the beam left around the punched holes on the upstream side has a width greater than the beam left around the holes on the downstream side, to provide the above mentioned greater stiffness on the upstream side. As a result, in the case of the fabricating the head arm of the same material, with the same thickness, and with weight reduced to the same degree as between the above mentioned embodiment of the present invention and a conventionally constructed magnetic head in accordance with, for example FIG. 2, the magnetic head device of the present invention can be provided with a greater stiffness on the upstream side of the head arm than was previously obtained with the prior art, which upstream side is subjected to a greater distributive loading force. This enables the elimination of the mechanical resonant frequency phenomena of the head arm by increasing the resonant frequency according to the increased stiffness with respect to the asymmetrically applied load and thereby prevents the head mounted on the free end of the cantilevered head assembly from vibrating and being misaligned with the desired track. While asymmetrical stiffness or rigidity can be obtained by making a plate thickness of the head arm asymmetrical, which is contemplated by the present invention, it is difficult to fabricate the head arm with a varying thickness, particularly by relying upon the usual type of punching. Furthermore, particularly in the case of a plurality of head arms rigidly connected together to move as a unit with respect to a plurality of coaxially rotating discs, the uniformity of the head arms is critical. However, according to the preferred embodiment of the present invention, the head arm having asymmetrical stiffness can easily be obtained by asymmetrically punching holes in the uniform thickness arm 8'.

Where the punched holes of the present invention have a triangular shape, not only the positions of the punched holes, but also the shape of the punched holes themselves can be made asymmetrical with respect to the reference line 15, thereby increasing the stiffness on the upstream side of the head arm 8' depending upon such shapes. For example, when three triangular or trapezoidal punched holes are provided serially in erect, inverted and erect form, for example, as shown in FIG. 1, the rigidity of the upstream side can be increased with respect to the downstream side while at the same time forming the very desirable beam construction of a truss or bridge girder structure. If an uneven number of such triangles is provided, for example three triangles, they may be alternately arranged as shown with a greater number of apexes to the upstream side from the downstream side to provide the correspondingly stronger beam or stiffness on the upstream side.

A read/write IC is generally disposed on the head arm 8' as close as possible to the magnetic heads so that it will not pick up noise easily. In this case, if the wind is directed to strike against the IC, it would not be desirable because the additional wind pressure would provide further distributive loading on the head arm to reduce response time and increase the possibility of vibrations and resonance frequency. To avoid this, the IC is mounted on the downwind side of the head arm 8'. However, with such a mounting of the IC, the center of gravity of the head arm, the head assembly in general, is unbalanced or made asymmetrical with respect to the line 15 and particularly unbalanced with respect to the axis of rotation of the shaft 10. According to the present invention, this unbalancing caused by the mounting of the IC on the downwind side for the purposes of lessening wind resistance is compensated for by shifting the movable component of the head actuator toward the upwind side, that is to the opposite side of the line 15 from the IC, to balance the distribution of mass about the axis of rotation of the shaft 10 and thereby centering the center of gravity with respect to the shaft 10. Therefore, no additional mass has to be added as a counterbalance to the asymmetrically mounted IC, because the counterbalancing is accomplished merely by shifting the position of the movable part of the actuator to a symmetrical positioning, whereby the low mass and quick response time, that is low inertia, of the movable head assembly can be maintained. This low mass also reduces the power requirements for driving the actuator and in general falls into the category of improved response.

The above discussion of the general purposes and structure will become more clear from the following detailed description of a preferred embodiment.

With respect to the various figures, like components are provided with like numerals.

Figure 3:
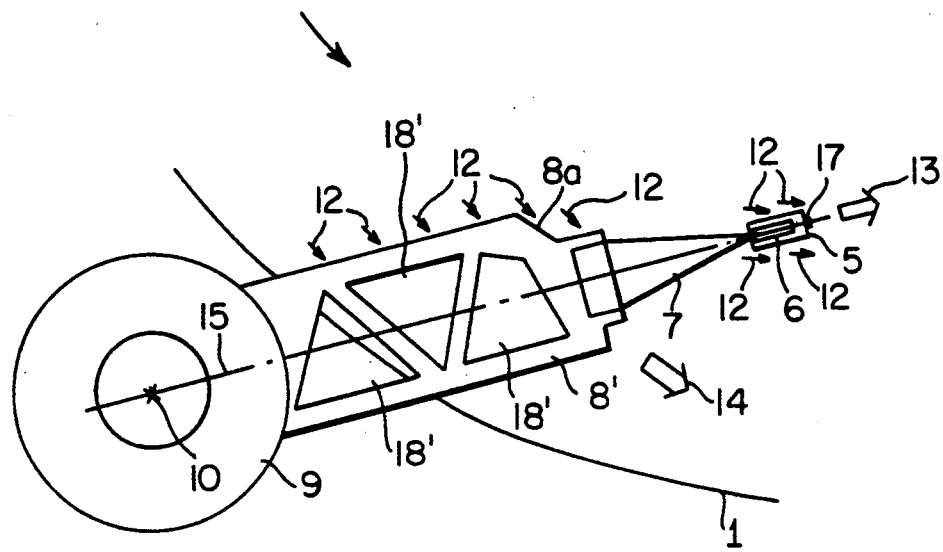
FIG. 3 is a plan view of the arm assembly of FIG. 1, on a greater scale, and showing an analysis of operation according to the present invention.

In the embodiment of FIG. 1, schematically shown in FIG. 3 with respect to its operation, the head core 17 is mounted on the magnetic head or head slider 5. The punched holes 18' are triangular or generally triangular or trapezoidal shaped and therefore assymetric with respect to the line 15. The movable part 11, particularly the coil 11, of the actuator rotates or swings the head arm 8' about the axis of the shaft 10. The actuator includes a stationary magnetic device (not shown) cooperating with coil 11 and supplies an electric current to the coil 11 under the control of a microcomputer to produce a drive force based upon Fleming's Law, so that the head arm 8' is moved in a high speed and the head 5 is accurately positioned to a predetermined location, with respect to a desired track on the disc 1. The drive force produced by the coil 11 is transmitted to the head 5 through the hub 9, the head arm 8', the load spring 7 and the gimbal spring 6. The disc 1 is fixed by a disc clamp 2 to a drive motor (not shown) so that it is rotatable at high speed about the center of rotation 3 in the rotational direction 4 to produce wind generally traveling in the direction 4 toward the arm 8'. The head 5 is arranged to be located, with respect to a line connecting the center 3 of rotation of the disc and the axis of rotation of the shaft 10, to the downstream side with respect to the direction of rotation 4.

The head 5, gimbal spring 6, load spring 7, hub 9 and coil 11 are arranged as a whole to provide an upstream edge and a downstream edge, respectively entirely on opposite sides of the line 15, that is, the line 15 is entirely contained between the upstream edge and the downstream edge, despite asymmetry of the head assembly in general. In this embodiment of FIG. 1 the asymmetry is provided by the triangular or trapezoidally shaped punched holes 18' formed in an arm 8'. These punched holes 18' leave or form a beam on the upstream edge that has a greater width and therefore a greater stiffness, than the beam formed or left by the punched holes on the downstream edge. Particularly as seen in FIG. 3, the greater stiffness is provided on the upstream edge with respect to the distributive load 12 produced by the wind coming in the direction of the arrow 4. Specifically, there are three such triangular shaped holes 18', alternately facing in opposite directions to obtain the asymmetry.

FIG. 3 corresponds to the embodiment of FIG. 1 and is somewhat schematic to illustrate the operation in greater detail. As shown in FIG. 3, distributed external forces 12, as caused by the wind moving in the direction 4, are along the leading edge of the head arm 8'. As shown in FIG. 3, and for the reasons mentioned previously, the external forces 12 exerted from wind produced by rotation of the disc 1 act upon the head 5, the gimbal spring 6 and the load spring 7 symmetrically or insignificantly with respect to the line 15, thereby produce a resultant force in the direction of the line 15 represented by the arrow 13, in general; any small component perpendicular thereto is negligible in comparison to the forces to be described with respect to the head 8'. Therefore, the components 5, 6, and 7 can be formed symmetrically shaped with respect to the line 15, although not necessarily according to the present invention. Furthermore, because of a circular shape applied to the hub 9, the external forces caused by the wind striking the hub 9 are bisymmetrical with respect to the direction of the wind flow and with respect to the axis of the shaft 10 and likewise the hub 9 can be formed as a symmetrical structure, preferably, although not necessarily. The actuator coil 11 can be constructed to be free of wind pressure by attaching a deflection plate (not shown) in a space between the coil 11 and disc 1, which deflection plate will deflect the wind in rotational direction 4 away from coil 11. The coil 11 can thus be of a symmetrical shape or otherwise. As discussed above and further below, the coil 11' can be asymmetrical or counterbalancing other asymmetrical masses, such as the IC 16 shown in FIG. 4, to be described later.

On the other hand, as shown in FIG. 3, the head arm 8' is subjected to asymmetrical distributive loading forces 12 resulting in asymmetrical resultant force 14, asymmetrical with respect to the line 15 as responding to the rotation of disc 1. In this embodiment, therefore, the shape, number and position of the punched holes 18' formed to reduce both the weight and the inertial moment of the arm 8' are set so that the arm 8' has sufficiently higher rigidity on the upstream edge than on the downstream edge, with respect to the line 15. As mentioned, the three triangular punched holes 18' are formed in respective asymmetrical positions so as to make the upstream beam stiffer than the downstream beam, due to the upstream beam being larger than the downstream beam. Also, although not shown, it is possible that the arm can be formed with a greater stiffness on the upstream edge than the downstream edge by punching circular holes, similar to those shown in FIG. 1, asymmetrical with respect to the line 15 while providing the leading edge and trailing edge of the head arm 8' symmetrical with respect to line 15, or by providing the cylindrical holes symmetrical with respect to line 15 and the leading and trailing edges asymmetrical so as to provide greater stiffness on the upstream side. However, the punching of circular holes means that the connecting portions extending from the upstream side to the downstream side can become extremely narrow when trying to achieve a sufficient reduction in weight, and thereby cylindrical holes are not efficient in removing mass and at the same time maintaining sufficient rigidity. With the present invention, the triangular holes, particularly alternately reversed, are particularly efficient for removing mass while maintaining sufficient strength for upstream and downstream beams as well as connecting beams, as well as providing for the desired asymmetry.

Furthermore, the outer contour of the head arm 8' may be tapered, trapezoidal or triangular as illustrated with respect to the conventional beam shown in FIG. 2, with the asymmetry of the present invention being provided internally by the punched holes. In the present embodiment, however, to increase the overall rigidity in the head arm 8', the head arm 8' is preferably formed rectangular with uniform width, that is parallel leading and trailing edges parallel also to the line 15, up to and close to the terminal end where it is connected to the load spring 7. However, according to another aspect of the present invention, it is desirable to provide a slant portion close to the terminal end of the head arm, or at least extending from the terminal end of the head arm backward along the upstream edge, to reduce the wind resistance on such an upstream edge. While this slant portion 8a shown in FIG. 3, contributes to further asymmetry, the upstream edge is still entirely to the upstream side of the line 15.

In FIG. 3, with the external forces 12, as distributed, caused by rotation of disc 1, the head 5 and head arm 8' are subjected to resultant external forces, respectively, represented by arrows 13 and 14. As mentioned previously, the head 5 is mounted so that in its middle track position, it is generally tangent to the adjacent track and therefore aligned with the direction of wind, so that it's symmetry with respect to the wind direction will therefore coincide with the line 15, so that the resultant force 13 on the head is generally collinear with line 15. However, the distributed external forces 12 caused by the wind on the leading edge of the head arm 8' are applied at an angle with respect to line 15 to provide a resultant external force 14 exerted on head arm 8' that is asymmetrical with respect to line 15. The resultant force 14 functions as an external force only against the windward edge of the head arm 8', in a plane parallel to the disc. In this embodiment, by making the stiffness or rigidity of the head arm 8' greater with respect to such distributive forces along the leading edge than would be the case with corresponding distributive forces applied in the opposite direction on the trailing edge, the resonant frequency of the head arm is accordingly increased, with respect to a like symmetric arm, to thereby lessen the degree of vibrations of the head arm that would be applied to and produce vibrations in the head 5.

Figure 4:
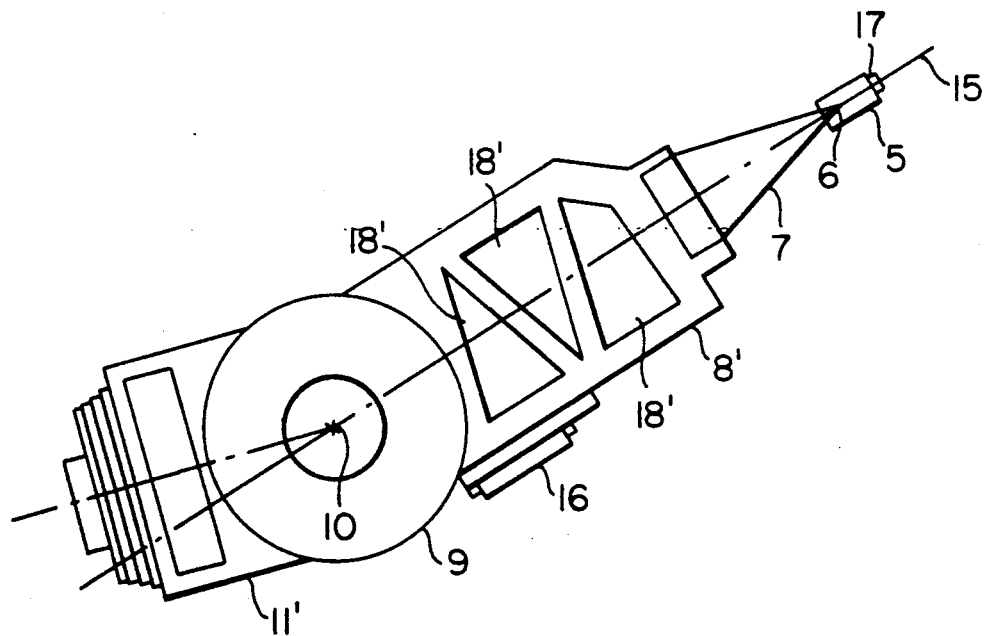
FIG. 4 is a plan view of the head assembly, showing a variation of the embodiment of FIG. 3.

FIG. 4 shows the same structure as that shown in FIG. 3, and the above description applies. In addition, FIG. 4 discloses the mounting of a read/write IC 16 and a shifting of the position of the actuator coil 11' from that shown in FIG. 1. On the downstream side of the asymmetrical head arm 8', there is attached the board that mounts thereon the read/write IC 16, which executes the reading and writing operation of data by the head 5, as well as the mounting of a substrate carrying resistors and capacitors for determining respective circuit constants. In general, since an electrical current for reading and writing data by the head is minute and likely to be affected by noise, the board mounting thereon the IC and other electronic components, should be arranged as close as possible to head 5. At the same time, in order to eliminate excessive wind pressure produced by the rotation of the disc 1 being applied to the signal lead-out wire, the IC mounting board, etc., is desirably arranged on the downstream side of the head arm 8'. However, where the IC mounting board is disposed on the downstream side of the head arm 8', the mass on the downstream side is increased to thereby unbalance the center of gravity with respect to the shaft 10 while providing further asymmetry with respect to the line 15. In this embodiment, to regain the balancing of the mass with respect to the axis of rotation of shaft 10, the actuator coil 11' is moved from its position shown in FIG. 1 towards the upstream side, with respect to line 15, about the axis of shaft 10 toward the upstream side through a predetermined angle with respect to the axis of the shaft 10 so as to balance the asymmetrical mass of the IC 16 and corresponding structure. Therefore, this shifting or asymmetrical shifting of the coil 11' serves the function of a counterbalance weight without the addition of any counterbalance weight. Therefore, by merely shifting existing structure, there is no need for additional mass to correct the imbalance and therefore there is no total increase in mass and no increase in the inertial moment of the arm. This shifting of the coil 11' may be applied to all of the structures shown herein and may be applied for counterbalancing other asymmetrical masses than the IC.

Figure 6:
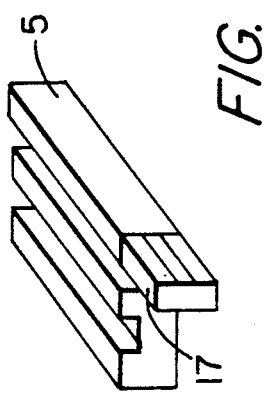
FIG. 6 is a perspective view of a variation of the transducer head, usable with the present invention.

FIGS. 5 and 6 are instructively showing different positionings of the head core 17 on the head 5 with respect to the line 15. These different structures are applicable to all of the heads shown herein, so that the head core may be symmetrical with the line 15 as shown in FIG. 5 or asymmetrical with respect to line 15 and as shown in FIG. 6. As shown in FIG. 3, since the resultant force 13 of the wind produced by the rotation of the disc 1 and exerted by the head 5 is symmetrical with respect to the line 15 and also parallel to the line 15, the head core 17 will not produce any unbalanced wind forces whether it is collinear with line 15 and shown in FIG. 5 or offset from the line 15 as shown in FIG. 6. Accordingly, it is not always necessary for the head core 17 to be symmetrical with respect to the line 15.

Figure 14:
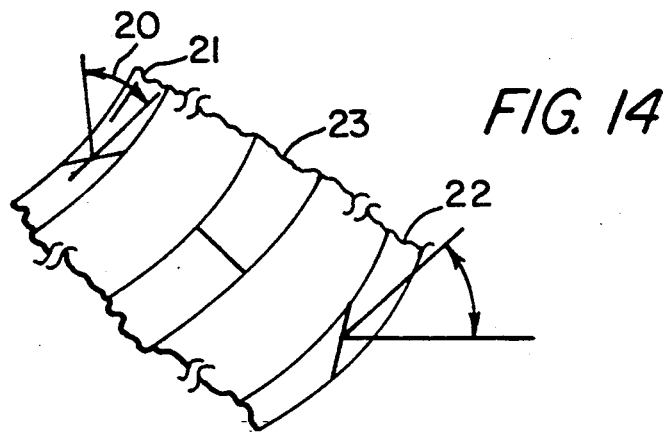
FIG. 14 shows track portions of a disc relative to yaw angle.

The previously described head assembly, with symmetrical coil 11 as shown in FIG. 1 or asymmetrical IC as shown in FIG. 3, may be provided with the following head orientation, as described with respect to FIG. 7. In FIG. 7, there is shown a head yaw angle, which is the inclination of the head axis with a tangent to the adjacent disc track, for various positions of the head with respect to the disc tracks. The innermost yaw angle 20, is the yaw angle for the innermost data track zone 21, and the outermost angle 19 is the yaw angle for the outermost data track or data zone 22. Since the angle of the head with respect to the track shifts due to the swing of the head about the axis of the shaft 10, the data track varies in width from inside to outside of the disc, as shown in FIG. 14, due to the change in the yaw angle, with the greatest data track width being for the track 23 shown wherein the yaw angle is zero. There has been a general tendency to increase the data density in the tracks. Due to the nature of a disc, the inner track has a greater density than the outer track. As seen from FIG. 14, the inner track has a smaller width than a track with zero yaw angle therefore, the most severe problems exist with respect to the inner track.

Figure 15:
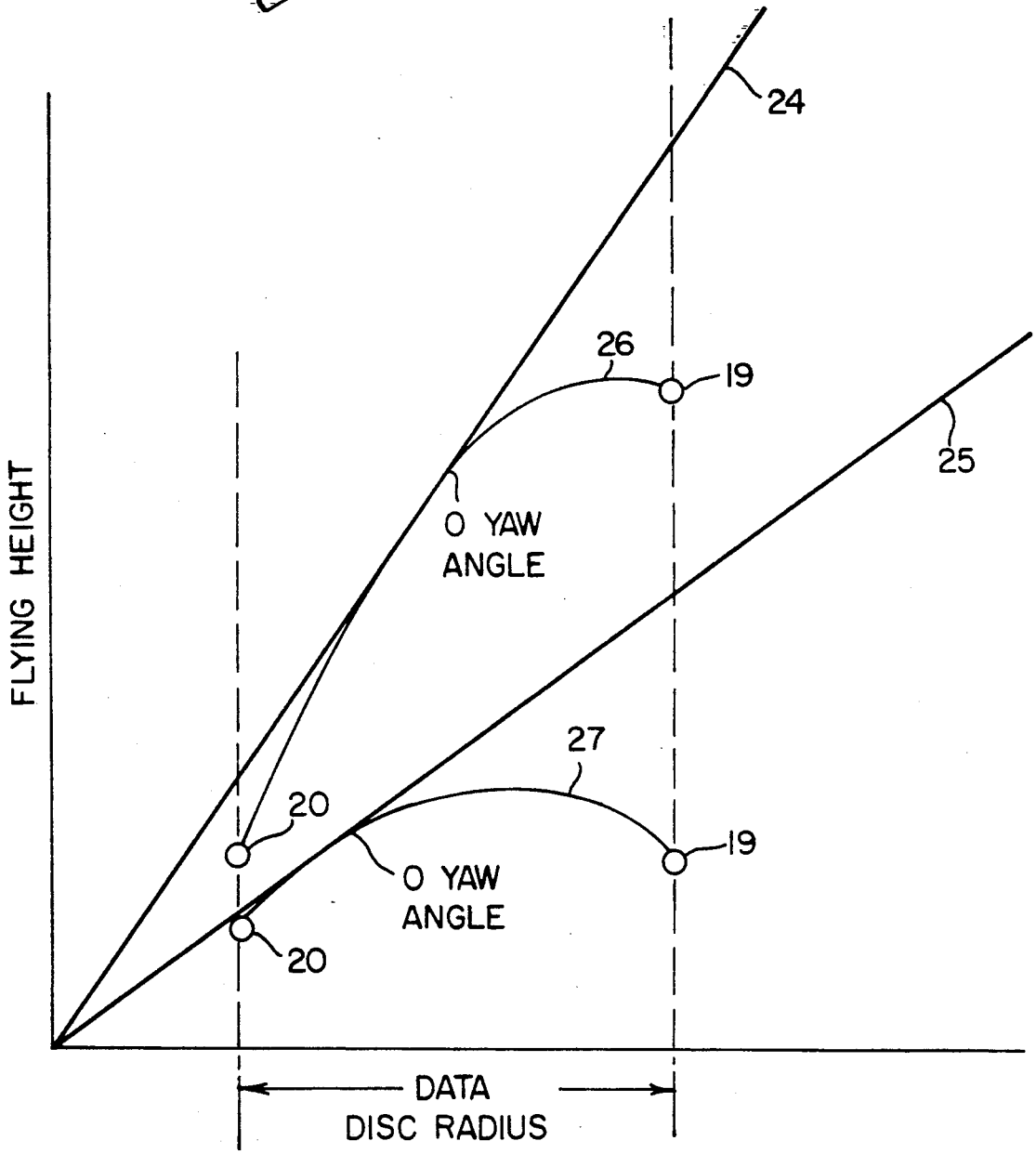
FIG. 15 is a plot of flying height vs. disc radius.

FIG. 15 shows a relationship between flying height of the slider surface and the disc radius. Along this radius, there is a range wherein the data is written, as indicated. The relationship between flying height and disc radius is a linear relationship originating at the zero intersection of flying height and disc radius, when there is always a zero yaw angle along the entire radius. About 10 years ago, the flying height was generally one micrometer, with reference to the straight line 24, and more recently is approximately 0.2 micrometers with reference to the straight line 25. To understand the criticality of the present analysis, if one considers the length of what is currently referred to as a jumbo jet and equates a ratio of the jumbo jet length to flying height with ratio of slider head surface to slider flying height, the relationship provides the jumbo jet with a flying height of approximately 4 mm. With this background, consider the actual case of the situation wherein the yaw angle changes as the head arm swings from inner track to outer track. It can be understood that an airplane, which flies with yaw angle generally zero, would have lessened flying capability when its yaw angle changes, or when it tries to fly somewhat sideways. The same is true of the head slider. Therefore, the head height drops when yaw angle increases, therefore, the curve 26 is representative of changing yaw angle, wherein 19 equals 20, for generally a high flying height. As the slope of line 24 approaches the slope of line 25, it is seen that angle 19 equal to 20 produces the undesirable result that the minimum flying height for the inner track, wherein air speed is less, becomes unacceptable and head crash becomes more likely. Therefore, the present invention shifts the relationship of 19 and 20, particularly shifts zero angle towards the center of the disc so that 20 is less than 19 to produce the more acceptable curve 27. The criticality of the flying height, particularly with respect to the flying height of 0.2 micrometers can be further appreciated when it is realized that the roughness of the surface of the disc is currently about 0.1 micrometers. Further a crash or contacting of the head with the disc can damage the head, the disc, and destroy data. Therefore, according to the present invention, the inner angle 20 for the yaw with respect to the innermost data track is set to be substantially smaller than the outer yaw angle 19 with respect to the outermost data track, in order to prevent deterioration in the data reading and writing of the head which would otherwise occur because of increased recording density in the inner peripheral regional track. Generally, as the linear recording density of data increases gradually from the outer zone towards the inner zone, according to the present invention, an offset angle of the magnetic head core with respect to the magnetic track, and hence the offset angle of the magnetic gap, is designed to become increasingly smaller toward the inner track, which is desirable for reproducing the higher density recording. Preferably, the inner angle 20 is substantially smaller than the outer angle 19. In general, the inner angle is between zero and nine degrees while the outer angle is between 21 and 12 degrees, because zero degrees for the inner angle is most advantageous for data reliability with respect to only the innermost track. Preferably, the inner angle 20 and outer angle 19 have the relationships of about 8 degrees and 13 degrees, respectively, particularly because an angle greater than 13 degrees sharply deteriorates the flying ability of the head. Therefore, this is the most preferable situation and the preferred range for the outer angle is 12 and 14 degrees while the preferred range for the inner angle is 6 to 9 degrees.

Figure 8:
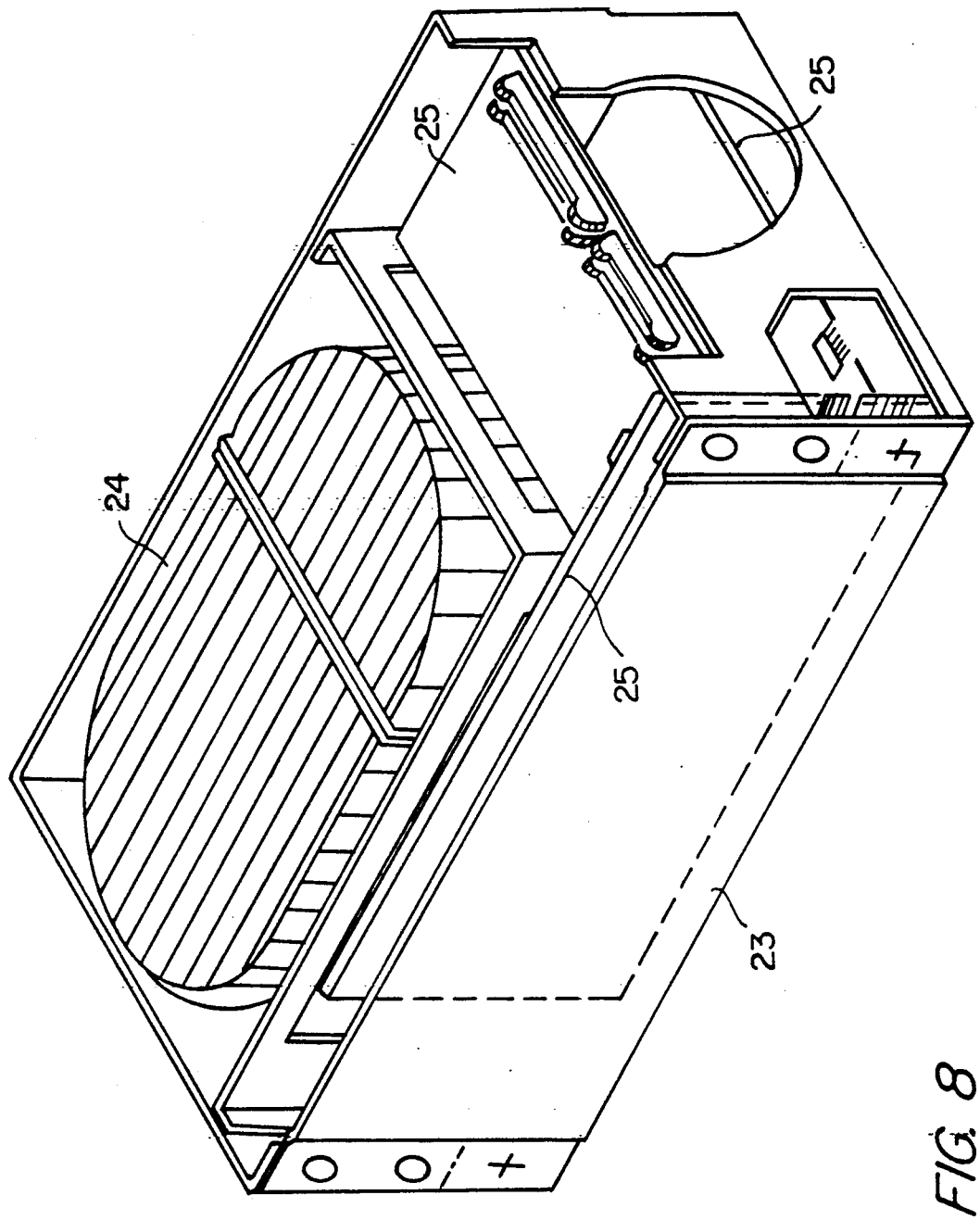
FIG. 8 is a perspective view of a disc drive assembly according to the present invention.
Figure 9:
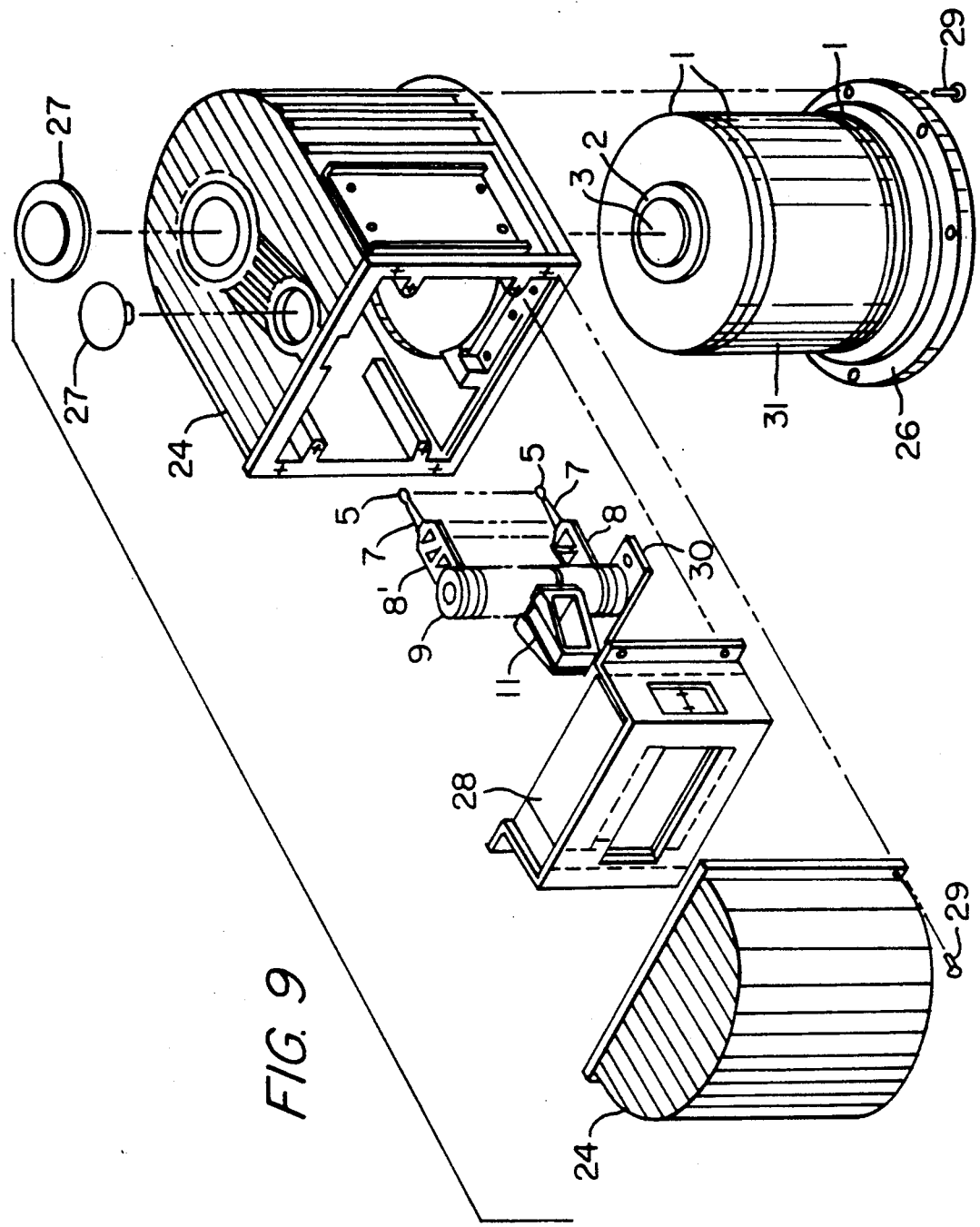
FIG. 9 is an exploded perspective view of the disc drive unit shown in FIG. 8.
Figure 10:
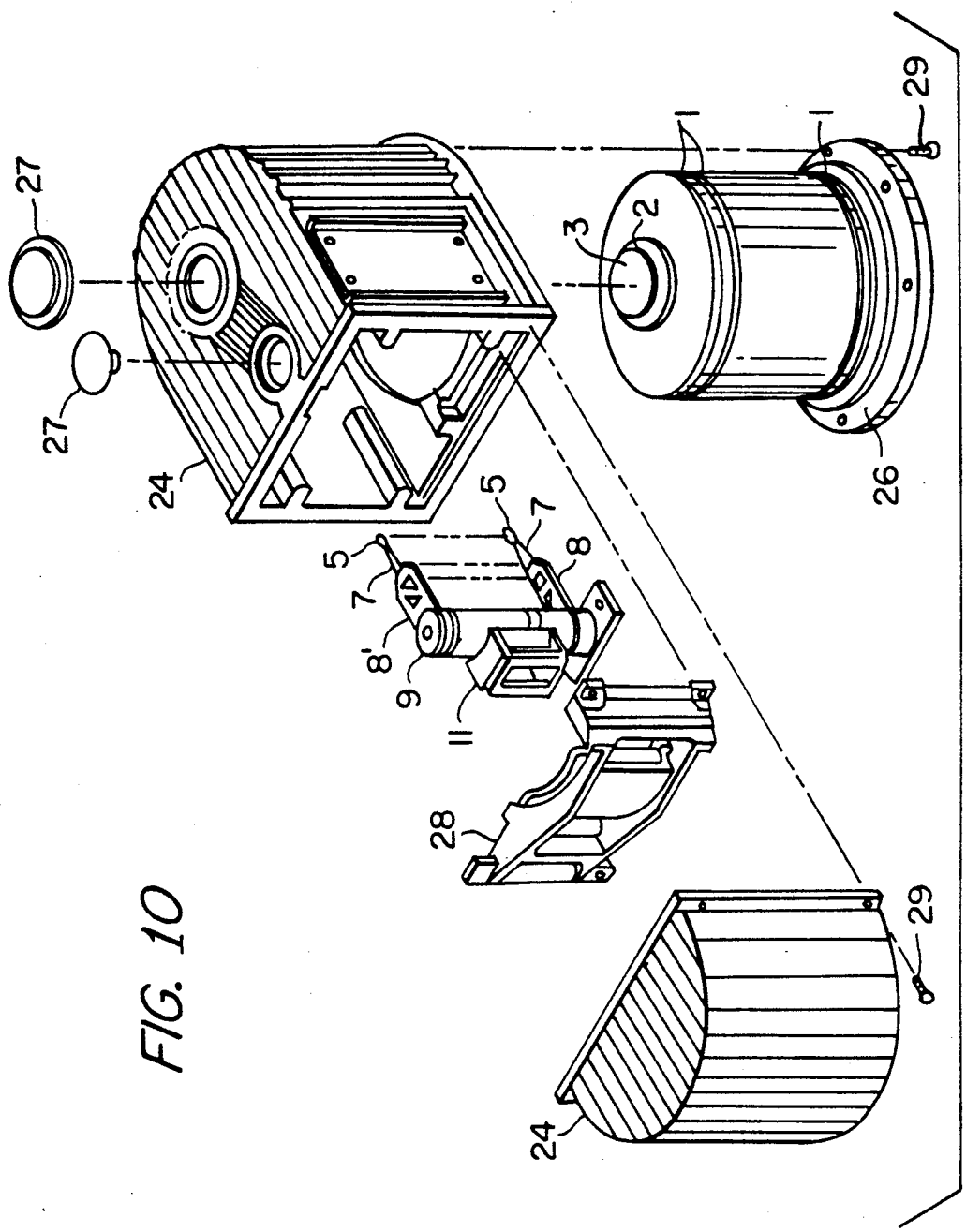
FIG. 10 is an exploded view, similar to FIG. 9, but of a variation of the actuator.

In the perspective views of FIGS. 8-10, the frame 23 carries a plurality of circuit boards 25 and head disc assembly HDA 24, which includes the disc 1, spindle assembly 31, carriage assembly 30 and voice coil 28, VCM. The disc 1 is mounted on a spindle motor 26 and fixed in place by means of the disc clamp 2 from above. The spindle assembly 31 as fixed to HDA 24 at the bottom portion by means of screws 29 and at the top by means of a cap 27. A plurality of head arms 8' is mounted for movement on the hub 9 along the actuator coil 11 that is opposite to the head arm 8'. The carriage assembly 30 is inserted into the HDA 24 and fixed at the top and bottom portions thereof. Coil 11 is attached to the carriage assembly 30 and inserted into the gap wherein magnet flux is generated by a magnet of VCM 28, so that the carriage assembly 30 is rotated dependent upon the electric current passing through the coil 11 for positioning the heads 5 to predetermined tracks of the respective disc 1 after seeking to thereby follow the tracks. In this embodiment, the VCM 28 includes a magnetic device having a E shape as shown in FIG. 9, penetrated by the coils 11 to be energized thereby.

FIG. 10 differs from FIG. 9 in providing an arcuate shape for the coil 11 and for the VCM 28, to reduce the overall size as compared to FIG. 9 while keeping the same performance resulting in less weight and less inertial moment with the carriage assembly 30.

Figure 11A:
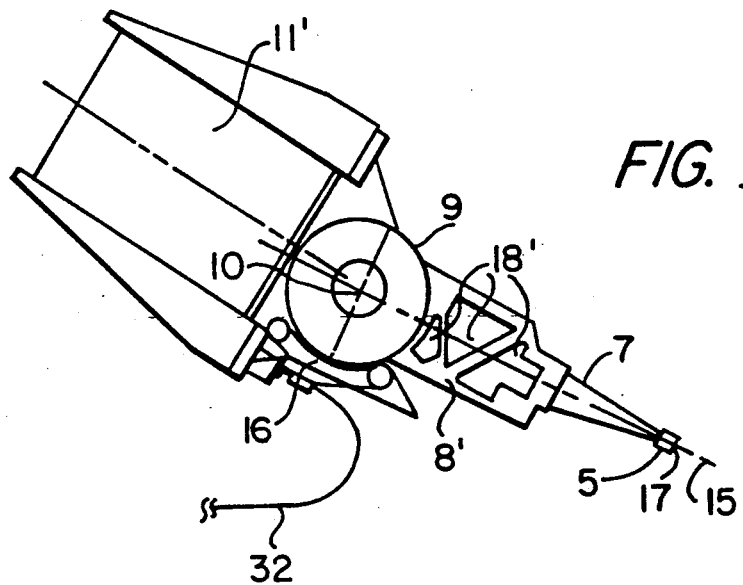
FIG. 11(a) is a plan view of a head assembly of the invention.
Figure 11B:
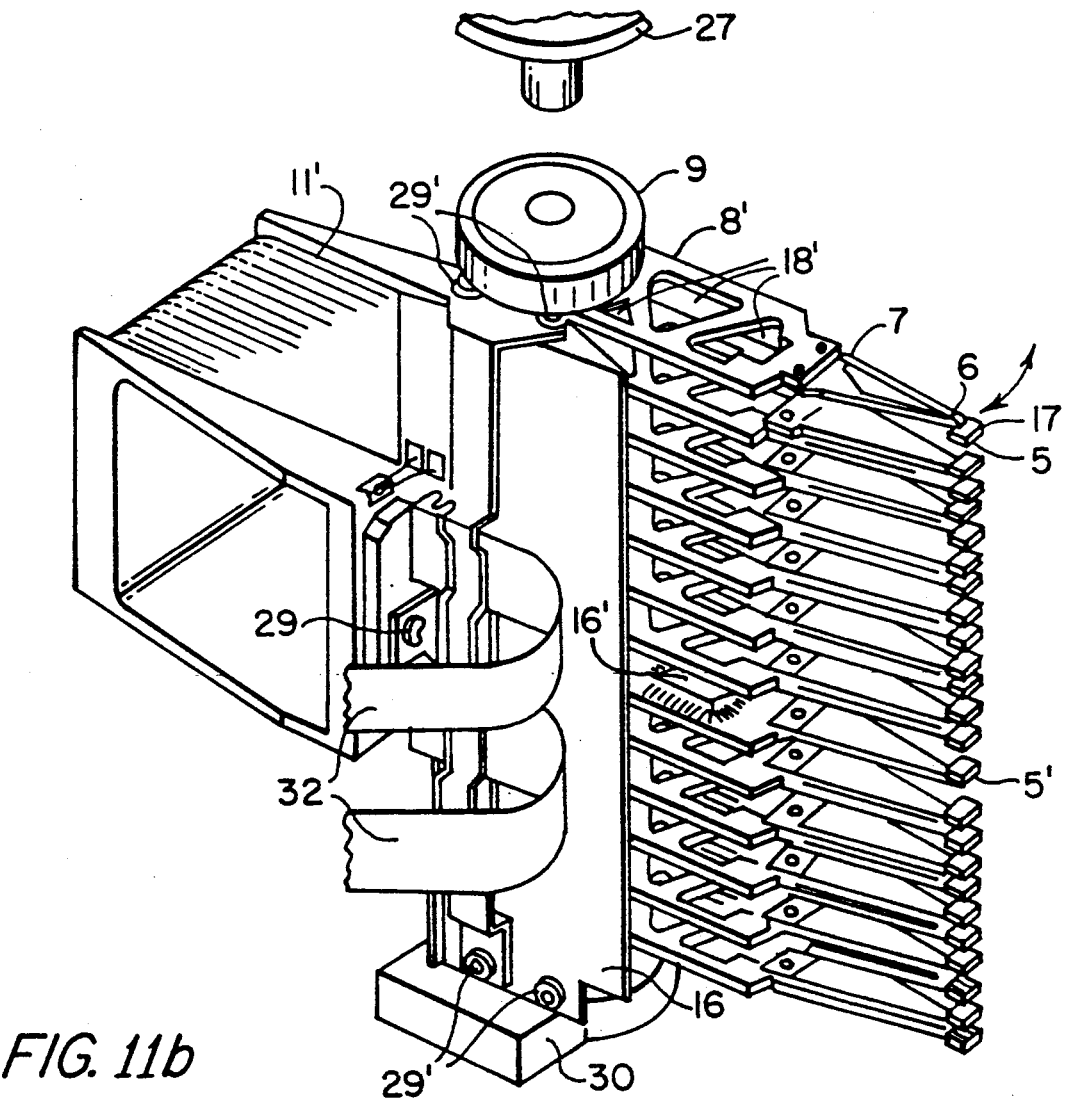
FIG. 11(b) is a perspective view of the head of FIG. 11(a)
Figure 12A:
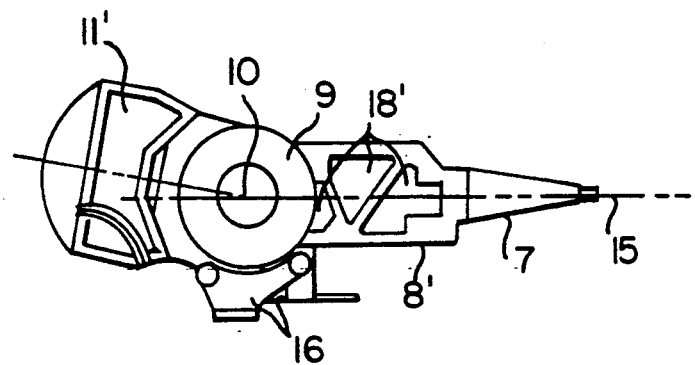
FIG. 12(a) shows a modification of FIG. 11.
Figure 12B:
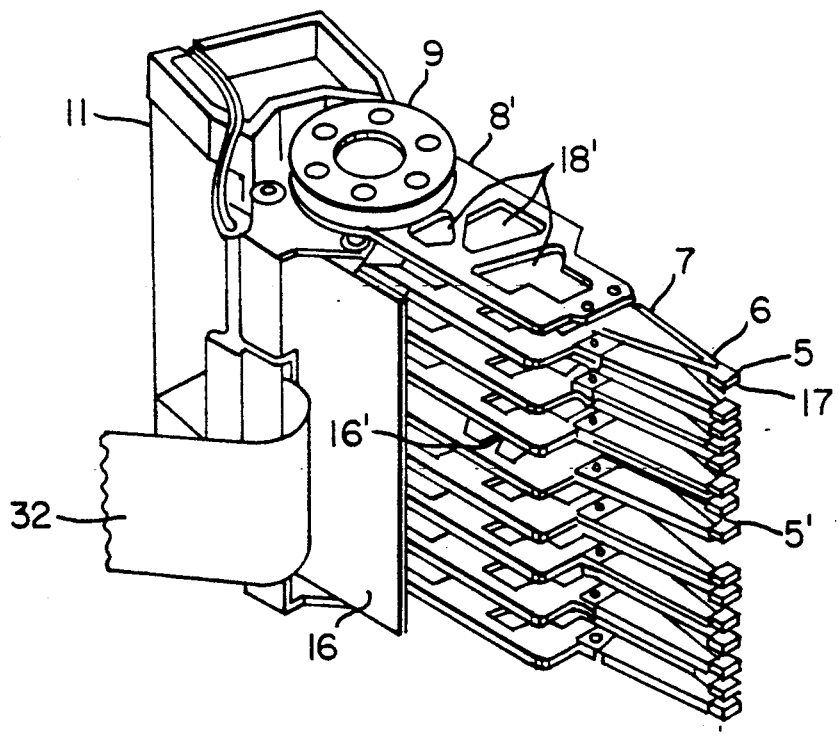
FIG. 12(b) shows a perspective view of the head assembly and actuator of FIG. 12(a)

As shown more particularly in FIGS. 11a and b, thirteen head assemblies are mounted together for the device of FIG. 9 with the head 5' serving as the servo head. On the IC board 16, there are further resistors and capacitors, all mounted by the screws 29. The FPC (flexible printed circuit) carries signal lines for the port. There is only one servo IC 16' disposed on the arm 8' symmetrical with respect to the line 15, so that mutual interference between the read/write IC 16 and the signal lines FPC 32 is reduced and the mass imbalance is also reduced for that particular arm. In the assembled carriage assembly 30, the arms are constructed as previously described, as are the coils 11, 11' so that all of the previously described head assembly structures may be combined in a plural assembly as shown in FIGS. 11-12. Accordingly, asymmetrical configuration of the present invention provides a number of effects, including greater upstream stiffness for improved resonance frequency in vibration resistance. This can be obtained by selection of punch hole type and punch hole position for example. In addition, the position of the coil can be used in the counterbalancing effect. The inner yaw angle can be made less substantially than the outer yaw angle for improved data reliability.

Figure 13:
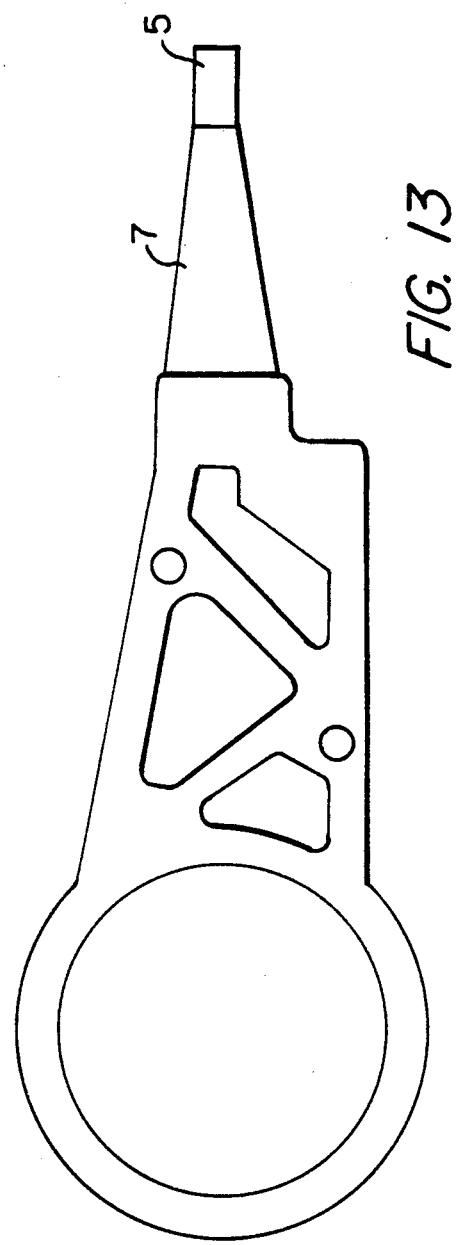
FIG. 13 is a perspective view of a further embodiment.

The slanted leading edge portion 8a of FIG. 3 can be extended over a greater proportion of the leading edge as shown in FIG. 13, which was previously mentioned with respect to FIG. 2.

While preferred embodiments along with variations and modifications has been set forth for disclosing the best mode and important details, further embodiments, variations and modifications are contemplated according to the broader aspects of the present invention, all as set forth in the spirit and scope of the following claims.

We claim:

1. Apparatus for retrieving data from a data storage disc, comprising:
   means for rotatably mounting the data storage disc for rotation about a disc axis and in a plane;
   a transducer head having a flying surface for flying at a height above the surface of the disc during rotating of the disc relative to the head;
   a gimbal spring mounting said transducer head thereon;
   an elongated cantilevered load spring having an outer end mounting thereon said gimbal spring and said transducer head, and an inner end;
   an elongated generally flat cantilevered head arm mounting on its outer end the inner end of said load spring and having an inner end;
   means rotatably mounting said inner end of said head arm about an arm axis generally parallel to the disc axis and closely adjacent to said disc;
   a rotary actuator for selectively rotating said head arm about the arm axis to swing said transducer head in an arcuate path across and parallel to the surface of the disc for reading and/or writing data from and/or to said disc;

only a single said transducer head, said gimbal spring and only a single said load spring transducing from the flying surface and being fixedly connected together on said head arm so that they together completely define a closed outer edge periphery, as viewed in said plane, for including in said closed outer edge periphery all of a line drawn from the center of said flying surface of said transducer head to said arm axis parallel to said plane; and said head arm outer edge periphery being asymmetrical with respect to said line such that the upstream, with respect to the wind produced by rotation of the disc, edge outer periphery being shaped differently from the corresponding downstream edge of said head arm so that said head arm is asymmetrical with respect to said line, and further to provide upstream edge means for said head arm having less wind resistance than the downstream edge with respect to a corresponding load wind traveling in the opposite peripheral direction, to thereby reduce the loading on said arm caused by rotation of the disc during operation of the disc drive unit.

2. A disc drive unit according to claim 1, wherein at least a portion of said upstream edge of said head arm is slanted toward said line to a greater extent than the portion of said downstream edge that is at the same distance from said arm axis and away from the peripheral wind produced by the rotation of the disc to lessen wind resistance on the upstream edge of said arm.

3. A disc drive unit according to claim 2, wherein said slanted edge portion extends from closely adjacent said load spring along said leading edge toward said axis of rotation of said head arm.

4. A disc drive unit according to claim 2, wherein said actuator includes a rotatably mounted hub supporting thereon directly said head arm; said portion of said leading edge that is slanted extends entirely from said hub to closely adjacent said load spring, for substantially the entire upstream edge of said head arm.

5. A disc drive unit according to claim 4, wherein said downstream edge extends generally parallel to said line from said hub to closely adjacent said load spring.

6. A disc drive unit according to claim 1, wherein said downstream edge is substantially parallel to said line, and said upstream leading edge is convergent toward said line as viewed from said rotary actuator toward said transducer head.

7. Apparatus for retrieving data from a data storage disc, comprising:

means for rotatably mounting the data storage disc for rotation about a disc axis and in a plane;

a transducer head having a flying surface for flying at a height above the surface of the disc during rotation of the disc relative to the head;

a gimbal spring mounting said transducer head thereon;

an elongated cantilevered load spring having an outer end mounting thereon said gimbal spring and said transducer head, and an inner end;

an elongated generally flat cantilevered head arm mounting on its outer end the inner end of said load spring and having an inner end;

means rotatably mounting said inner end of said head arm about an arm axis generally parallel to the disc axis and closely adjacent to the disc;

a rotary actuator for selectively rotating said head arm about the arm axis to swing said transducer head in an arcuate path across and parallel to the surface of the disc for reading and/or writing data from and/or to said disc;

only a single said transducer head, said gimbal spring and only a single said load spring transducing from the flying surface and being fixedly connected together on said head arm so that they together completely define a closed outer edge periphery, as viewed in said plane, for including in said closed outer edge periphery all of a line drawn from the center of said flying surface of said transducer head to said arm axis, and parallel to said plane; and said head arm constituting beam means having a stiffness, with respect to a distributed wind resistance load provided by rotation of the disc against the upstream edge and within said plane, that is substantially greater than the stiffness with respect to a corresponding load applied against the downstream edge in said plane and in the opposite disc peripheral direction from said upstream wind distributed load, for increasing the resonant frequency of vibration of said transducer head within said plane, in the peripheral direction of said disc, with respect to a like head arm having symmetrical stiffness with respect to said line and otherwise being identical.

8. The disc drive unit according to claim 7, wherein said head arm is constructed with an upstream beam, a downstream beam, connecting structure between said beam and a plurality of through apertures perpendicular to the plane between said beams and connecting structure, and said upstream beam being substantially larger than said downstream beam.

9. The disc drive unit according to claim 8, wherein said beams are of equal thickness, as measured perpendicular to said plane and said upstream beam is substantially wider than said downstream beam and of the same material.

10. The disc drive unit according to claim 8, wherein said upstream beam is substantially thicker than downstream beam.

11. The disc drive unit according to claim 8, wherein said head arm apertures are generally triangular shaped, with a first triangular shape having a base adjacent said upstream edge and an apex adjacent said downstream edge between second type triangular shapes having a base adjacent said downstream edge and an apex adjacent said upstream edge to form a truss beam as viewed in said plane, with the number of said second type triangular shapes being greater than the number of first type triangular shapes.

12. The disc drive unit according to claim 8, wherein the area, as viewed in said plane, of said apertures in said head arm on the downstream side of said arm is greater than the area of said apertures on the upstream side of said arm.

13. The disc drive unit according to claim 7, including said head arm outer periphery being asymmetrical with respect to said line such that the upstream, with respect to the wind produced by rotation of the disc, edge outer periphery being shaped differently from the corresponding downstream edge of said head arm so that said head arm is asymmetrical with respect to said line, and further to provide upstream edge means for said head arm having less wind resistance than the downstream edge with respect to a corresponding load in the opposite peripheral direction with respect to said downstream edge, to thereby reduce the loading on said arm caused by rotation of the disc during operation of the disc drive unit.

14. A disc drive unit according to claim 13, wherein at least a portion of said upstream edge of said head arm is slanted toward said line to a greater extent than the corresponding portion of said downstream edge and away from the peripheral wind produced by the rotation of the disc to lessen wind resistance on the upstream edge of said arm.

15. A disc drive unit according to claim 14, wherein said slanted edge portion extends from closely adjacent said load spring along said leading edge toward said axis of rotation of said head arm.

16. A disc drive unit according to claim 14, wherein said actuator includes a rotatably mounted hub supporting thereon directly said head arm; and said slanted edge portion extends entirely from said hub to closely adjacent said load spring, for substantially the entire leading edge of said head arm.

17. A disc drive unit according to claim 13, wherein said downstream edge is substantially parallel to said line, and said upstream leading edge is convergent toward said line as viewed from said rotary actuator toward said transducer head.

18. A disc drive unit according to claim 16, wherein said downstream edge extends generally parallel to said line from said hub to closely adjacent said load spring.

19. Apparatus for retrieving data from a data storage disc, comprising:
means for rotatably mounting the data storage disc for rotation about a disc axis and in a plane:
a transducer head having a flying surface for flying at a height above the surface of the disc during rotation of the disc relative to the head;
a gimbal spring mounting said transducer head thereon;
an elongated cantilevered load spring having an outer end mounting thereon said gimbal spring and said transducer head, an an inner end;
an elongated generally flat cantilevered head arm mounting on its outer end the inner end of said load spring and having an inner end;
means rotatably mounting said inner end of said head arm about an arm axis generally parallel to the disc axis and closely adjacent to the disc;
a rotary actuator for selectively rotating head arm about the arm axis to swing said transducer head in an arcuate path across and parallel to the surface of the disc for reading and/or writing data from and/or to said disc;
only a single said transducer head, said gimbal spring and only a single said load spring transducing from the flying surfacr and being fixedly connected together on said head arm so that they together completely define a closed outer edge periphery, as viewed in said plane, for including in said closed outer edge periphery all of a line drawn from the center of said flying surface of said transducer head to said arm axis, parallel to said plane; and
a plurality of through holes in said head arm extending in a direction perpendicular to said plane for forming an upstream and a downstream beam, the area of said holes as viewed in said plane being asymmetrical with respect to said line for inertially balancing.

20. The disc drive unit according to claim 19, wherein the area of said holes, as viewed in said plane, on the downstream side of said line is larger than the area on the upstream side of said line.

21. The disc drive unit according to claim 20, wherein said head arm holes are generally triangular shaped, with a first triangular shape having a base adjacent the upstream edge and an apex adjacent said downstream edge between second type of triangular shapes having a base adjacent said downstream edge and an apex adjacent said upstream edge to form a truss beam as viewed in said plane, with the number of said second type triangular shapes being greater than the number of first type triangular shapes.

22. The disc drive unit according to claim 21, wherein there are a plurality of hard discs coaxially spaced from each other and extending parallel to said plane, and being substantially identical to each other; a plurality of said head arms, load springs, gimbal springs, and transducer head arms coaxially mounted on said arm axis and commonly driven by said rotary actuator to form respective head assemblies on each side of each disc.

23. The disc drive unit according to claim 22, including said head arm outer periphery being asymmetrical with respect to said line such that the upstream, with respect to the wind produced by rotation of the disc, edge outer periphery being shaped differently from the downstream edge outer periphery of said head arm so that said head arm is asymmetrical with respect to said line, and further to provide upstream edge means for said head arm having less wind resistance than the downstream edge with respect to a corresponding load in the opposite peripheral direction with respect to said downstream edge, to thereby reduce the loading on said arm caused by rotation of the disc during operation of the disc drive unit.

24. Apparatus for retrieving data from a data storage disc, comprising:
means for rotatably mounting the data storage disc for rotation about a disc axis and in a plane;
a transducer head having a flying surface for flying at a height above the surface of the disc during rotation of the disc relative to the head;
a gimbal spring mounting said transducer head thereon;
an elongated cantilevered load spring having an outer end mounting thereon said gimbal spring and said transducer head, and an inner end;
an elongated generally flat cantilevered head arm mounting on its outer end the inner end of said load spring and having an inner end;
means rotatably mounting said inner end of said head arm about an arm axis generally parallel to the disc axis and closely adjacent to the disc;
a rotary actuator for selectively rotating said head arm about the arm axis to swing said transducer head in an arcuate path across and parallel to the surface of the disc for reading and/or writing data from and/or to said disc;
said transducer head, said gimbal spring, said load spring, and said head arm being fixedly connected together so that they together define a completely closed outer edge periphery, as viewed in said plane, for including in said closed outer edge periphery all of a line drawn from the center of said flying surface of said transducer head to said arm axis, parallel to said plane;

said transducer head, said gimbal spring, said load spring and said head arm at least partially forming a cantilevered transducer assembly, and said assembly having a greater mass, as viewed in said plane, on one side of said line than the other side of said line; and said rotary actuator having a stationary portion and a movable portion mounted rigidly with respect to said assembly, and said movable portion, when viewed in said plane, having greater mass on the other side of said line than said one side of said line for inertially balancing.

25. The disc drive unit according to claim 24, wherein said assembly has a greater mass on the downstream side of said line for reducing wind resistance and said actuator has an actuator coil asymmetrically arranged with respect to said line to have greater mass on said other side of said line.

26. The disc drive assembly of claim 25, including integrated circuit means for read write operations with respect to said transducer head mounted on said downstream side of said load arm for reducing wind resistance, and the coil of said actuator assembly being asymmetrical with respect to said line with a greater mass on the upstream side of said line for inertially balancing the mass of said integrated circuit means.

27. The disc drive unit according to claim 26, further including a wind deflector deflecting wind aerodynamically away from said integrated circuit means for reducing wind resistance, and said coil of said actuator means being shifted to the upstream side of said line for balancing the mass of said wind deflector.

28. The disc drive unit according to claim 24, including a plurality of through holes in said head arm extending in a direction perpendicular to said plane for forming an upstream and a downstream beam, the area of said holes as viewed in said plane being asymmetrical with respect to said line.

29. The disc drive unit according to claim 28, including said head arm outer edge periphery being asymmetrical with respect to said line such that the upstream, with respect to the wind produced by rotation of the disc, edge outer periphery being shaped differently from the downstream edge outer periphery of said head arm so that said head arm is asymmetrical with respect to said line, and further to provide upstream edge means for said head arm having less wind resistance than the downstream edge with respect to a corresponding load in the opposite peripheral direction with respect to said downstream edge, to thereby reduce the loading on said arm caused by rotation of the disc during operation of the disc drive unit.

30. The disc drive unit according to claim 28, wherein the area of said holes, as viewed in said plane, on the downstream side of said line is larger than the area on the upstream side of said line.

31. Apparatus for retrieving data from a data storage disc, comprising:

means for rotatably mounting the data storage disc for rotation about a disc axis and in a plane;

a transducer head having a flying surface for flying at a height above the surface of the disc during rotation of the disc relative to the head;

a gimbal spring mounting said transducer head thereon;

an elongated cantilevered load spring having an outer end mounting thereon said gimbal spring and said transducer head, and an inner end;

an elongated generally flat cantilevered head arm mounting on its outer end the inner end of said load spring and having an inner end;

means rotatably mounting said inner end of said head arm about an arm axis generally parallel to the disc axis and closely adjacent to the disc;

a rotary actuator for selectively rotating said head arm about the arm axis to swing said transducer head in an arcuate path across and parallel to the surface of the disc for reading and/or writing data from and/or to said disc;

said transducer head, said gimbal spring, said load spring, and said head arm being fixedly connected together so that they together completely define a closed outer edge periphery, as viewed in said plane, for including in said closed outer edge periphery all of a line drawn from the center of said flying surface of said transducer head to said arm axis, parallel to said plane;

the disc having a plurality of substantially concentric data tracks, concentric with respect to the disc axis and providing magnetic storage of data;

said transducer head having a magnetic gap for reading the data from said tracks;

at one rotational position of said head assembly, said magnetic gap being substantially tangential to the adjacent track of said disc;

said magnetic gap having an inclined position at the outermost operative position of said head assembly with an outer yaw angle as measured in one direction relative to the tangent to the adjacent track; and said magnetic gap having an inclined position at the innermost operative position of said head assembly with an inner yaw angle, as measured in the other direction relative to the tangent to the adjacent track, and said outer yaw angle being substantially larger than said inner yaw angle.

32. The disc drive according to claim 31, wherein said inner yaw angle is within a range of zero to 9 degrees and said outer yaw angle is within a range of 20 degrees to 12 degrees, so that the yaw angle is less for the inner track wherein the data has a greater density to provide for a greater track width than at the outer track wherein the data is less dense and therefore the track width may reliably be narrower.

33. The disc drive unit accoriding to claim 30, wherein said inner yaw angle is between 2 degrees and 9 degrees, and said outer yaw angle is between 12 degrees and 19 degrees.

34. The disc drive unit according to claim 33, wherein the flying height of said transducer head is equal to or less than 0.2 micrometers.

35. The disc drive unit according to claim 32, wherein said inner yaw angle is about 8 degrees and said outer yaw angle is about 13 degrees.

36. The disc drive unit according to claim 35, wherein the flying height of said transducer head is equal to or less than 0.2 micrometers.

37. The disc drive unit according to claim 32, wherein the flying height of said transducer head is equal to or less than 0.2 micrometers.

38. The disc drive unit according to claim 31, wherein the flying height of said transducer head is equal to or less than 0.2 micrometers.

39. The disc drive unit according to claim 31, including a plurality of through holes in said head arm extending in a direction perpendicular to said plane for forming an upstream and a downstream beam, the area of said holes as viewed in said plane being asymmetrical with respect to said line.

40. The disc drive unit according to claim 39, including said head arm outer periphery being asymmetrical with respect to said line such that the upstream, with respect to the wind produced by rotation of the disc, edge outer periphery being shaped differently from the downstream edge outer periphery of said head arm so that said head arm is asymmetrical with respect to said line, and further to provide upstream edge means for said head arm having less wind resistance than the downstream edge with respect to a corresponding load in the opposite peripheral direction with respect to said downstream edge, to thereby reduce the loading on said arm caused by rotation of the disc during operation of the disc drive unit.

41. The disc drive unit according to claim 39, wherein the area of said holes, as viewed in said plane, on the downstream side of said line is larger than the area on the upstream side of said line.

42. Apparatus for retrieving data from a data storage disc, comprising:
  means for rotatably mounting the data storage disc for rotation about a disc axis and in a plane;
  a transducer head having a flying surface for flying at a height above the surface of the disc during rotation of the disc relative to the head;
  a gimbal spring mounting said transducer head thereon;
  an elongated cantilevered load spring having an outer end mounting thereon said gimbal spring and said transducer head, and an inner end;
  an elongated generally flat cantilevered head arm mounting on its outer end the inner end of said load spring and having an inner end;
  means rotatably mounting said inner end of said head arm about an arm axis generally parallel to the disc axis and closely adjacent to the disc;
  a rotary actuator for selectively rotating said head arm about the arm axis to swing said transducer head in an arcuate path across and parallel to the surface of the disc for reading and/or writing data from and/or to said disc;
  only a single said transducer head, said gimbal spring, only a single said load spring transducing from the flying surface and being fixedly connected together on said head arm so that they together completely define a closed outer edge periphery, as viewed in said plane, including in said closed outer edge periphery all of a line drawn from the center of said flying surface of said transducer head to said arm axis, parallel to said plane;
  said transducer head, said gimbal spring, said load spring and said head arm at least partially forming a cantilevered transducer assembly; and
  said rotary actuator having a stationary portion and a movable portion mounted with respect to said assembly, and said movable portion, when viewed in said plane, being asymmetrical with respect to said line for inertially balancing.

* * * * *